UNITED STATES PATENT OFFICE.

CHRISTOPHER C. SMITH, OF COOL SPRINGS, GEORGIA.

IMPROVEMENT IN PROCESSES FOR PRESERVING MEATS.

Specification forming part of Letters Patent No. 221,113, dated October 28, 1879; application filed May 24, 1879.

*To all whom it may concern:*

Be it known that I, CHRISTOPHER C. SMITH, of Cool Springs, in the county of Wilkinson and State of Georgia, have invented certain new and useful Improvements in Processes for Preserving Meats; and I do hereby declare that the following is a full, clear, and exact description thereof.

The nature of my invention relates to processes and compounds for preserving meat; and it consists, essentially, in dipping the meat, after it has remained in pickle for a suitable length of time, in scalding water, and then coating the same with a mixture of lime, meal, and pepper, as will be hereinafter more fully set forth.

The meat is first placed in salt or pickle, and allowed to remain there from four to six weeks, (more or less,) according to circumstances. When it is taken from the pickle it is immediately dipped in scalding water, after which it is coated with a mixture of lime, meal, and pepper. These ingredients are to be previously mixed in about equal quantities and thoroughly sifted. The meat is then simply laid upon suitable racks, instead of being hung up, as is usual in other processes for preserving meat.

The usual process of preserving meat involves a great deal of unnecessary trouble, and then does not prevent the insects from preying upon the meat.

My process not only saves time and labor, but also saves that portion of the meat that drips away when hung up, as the meat is not hung up at all.

Having thus fully described my invention, what I claim as new, and desire to secure by Letters Patent, is—

1. The within-described process for preserving meat, consisting, essentially, in first soaking the meat in pickle for a suitable period, then dipping it in scalding water, and finally coating it with a mixture of lime, meal, and pepper, substantially as herein set forth.

2. The compound consisting of lime, meal, and pepper, for the purposes herein set forth.

In testimony that I claim the foregoing as my own I affix my signature in presence of two witnesses.

C. C. SMITH.

Witnesses:
 N. B. BAUM,
 B. O. BANNON.